(12) United States Patent
Okazaki et al.

(10) Patent No.: US 6,168,195 B1
(45) Date of Patent: Jan. 2, 2001

(54) OCCUPANT PROTECTING DEVICE

(75) Inventors: Hidetsugu Okazaki; Osamu Kyogoku; Takeru Otsuka, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/114,256

(22) Filed: Jul. 13, 1998

(30) Foreign Application Priority Data

Jul. 15, 1997 (JP) .................................................... 9-189562
Jul. 15, 1997 (JP) .................................................... 9-189563

(51) Int. Cl.$^7$ .................................................................. B60R 21/18
(52) U.S. Cl. .................. 280/733; 280/730.1; 280/730.2; 280/801.1
(58) Field of Search ..................................... 280/733, 730, 280/801.1, 730.1, 730.2

(56) References Cited

U.S. PATENT DOCUMENTS

| | | | |
|---|---|---|---|
| 3,682,498 | * 8/1972 | Rutzki | 280/733 |
| 3,791,670 | * 2/1974 | Lucore et al. | 280/733 |
| 3,874,694 | * 4/1975 | Stephenson | 280/733 |
| 3,970,329 | * 7/1976 | Lewis | 280/733 |
| 5,393,091 | * 2/1995 | Tanaka et al. | 280/733 |
| 5,445,411 | * 8/1995 | Kamiyama et al. | 280/733 |
| 5,465,999 | * 11/1995 | Tanaka et al. | 280/733 |
| 5,474,326 | * 12/1995 | Cho | 280/733 |
| 5,597,178 | * 1/1997 | Hardin, Jr. | 280/733 |
| 5,851,055 | * 12/1998 | Lewis | 297/483 |
| 6,019,388 | * 2/2000 | Okazaki et al. | 280/733 |

FOREIGN PATENT DOCUMENTS 6-262996    9/1994   (JP) .

* cited by examiner

Primary Examiner—Brian L. Johnson
Assistant Examiner—Deanna Draper
(74) Attorney, Agent, or Firm—Armstrong, Westerman, Hattori, McLeland & Naughton (57) ABSTRACT

In an occupant protecting device including an expandable bag housed within a belt for holding back an occupant upon collision of a vehicle, an outlet opening $33_1$ in a buckle-side duct 28 and an inlet opening $18_3$ in a tongue-side duct 18 are opposed to each other through a gap α, and a seal member 35 made of a rubber and integrally provided with an outer lip portion $35_2$ and an inner breakable portion $35_3$ is mounted to the outlet opening $33_1$. When a gas generated by an inflater upon collision of the vehicle is supplied to the buckle-side duct, the breakable portion $35_3$ of the seal member 35 is broken to bring the lip portion $35_2$ into close contact with the inlet opening $18_3$, so that the gas is supplied from the buckle-side duct 28 through the tongue-side duct 18 to a shoulder belt, thereby expanding a bag housed in the shoulder belt. Thus, it is possible to easily and reliably perform the sealing of a gas passage in a connection between a buckle 31 and a tongue 19.

12 Claims, 11 Drawing Sheets

OCCUPANT PROTECTING DEVICE

BACKGROUND OF THE INVENTION

1. Field of the Invention

The present invention relates to an occupant protecting device including an expandable bag housed within a belt for holding back an occupant upon collision of a vehicle.

2. Description of the Related Art

Such a system is already known, for example, from Japanese Patent Application Laid-open No.6-262996.

The known occupant protecting device is designed so that when a tongue provided on a belt is to be coupled to a buckle mounted on a seat, a tongue pipe integral with the tongue is connected to a gas flow passage provided in the buckle. Therefore, it is necessary to seal the connection between the gas flow passage and the tongue pipe, so that, when a gas generated by an inflater is supplied from the gas flow passage through the tongue pipe to the belt, leakage of the gas may not occur. However, the buckle and the tongue are members which are repeatedly attached and detached, and if a typical seal member such as an O-ring and the like is employed, the following problems occur. The attachment and detachment of the buckle and the tongue are troublesome, because they are obstructed by the seal member, and the durability of the seal member is reduced by the friction produced during the attachment and detachment.

In the above device, a caulking fitment fitted over the outer periphery of an end of the belt is caulked inwards and fixed to the tongue pipe, so that when a large tensile load is applied to the belt upon collision of the vehicle, the coupled portions of the belt and tongue pipe are not separated from each other. But, there is a problem in that it is impossible to reliably prevent the withdrawal of the belt only by the fixing structure.

SUMMARY OF THE INVENTION

Accordingly, it is a first object of the present invention to ensure that the sealing of a gas passage at the connection between a buckle and a tongue can be easily and reliably performed.

It is a second object of the present invention to ensure that a belt and a tongue-side duct are firmly fixed to enhance the durability against a tensile load.

To achieve the above objects, according to a first aspect and feature of the present invention, there is provided an occupant protecting device comprising a buckle-side duct integral with a buckle supported on a seat, and a tongue-side duct integral with a tongue supported on a belt, the buckle and the tongue being coupled to each other to connect an outlet opening in the buckle-side side duct to an inlet opening in the tongue-side duct, the belt being expanded by supplying a gas generated by an inflater upon collision of a vehicle to the belt through the buckle-side duct and the tongue-side duct, the outlet opening in the buckle-side duct being closed by a membrane-like shaped seal member which is integrally provided with a lip portion at a peripheral edge thereof and a central breakable portion, and the sealing between the outlet and inlet openings being performed by breaking the breakable portion of the seal member by the pressure of the gas generated by the inflater upon collision of the vehicle to bring the lip portion into close contact with the inlet opening in the tongue-side duct.

With the above arrangement, when the gas generated by the inflater due to the collision of the vehicle is supplied to the buckle-side duct, the breakable portion of the seal member closing the outlet opening is broken to bring the lip portion into close contact with the inlet opening. Therefore, the gas in the buckle-side duct can be supplied to the tongue-side duct without being leaked from a gap between the outlet opening and the inlet opening, thereby expanding the belt connected to the tongue-side duct. When the occupant protecting device is in a non-used state in which the tongue is not coupled to the buckle, the outlet opening in the buckle-side duct is covered with the seal member and hence, the entry of dust into the buckle-side duct through the outlet opening can be prevented. Further, when the tongue is attached to or detached from the buckle, the seal member does not rub any other member. Therefore, it is not only easy to attach and detach the tongue, but also the durability of the seal member is enhanced.

In addition to the above first feature, the occupant protecting device is constructed, so that when the buckle and the tongue have been coupled to each other, a gap for venting the gas is defined between the outlet opening in the buckle-side duct and the inlet duct in the tongue-side duct. Therefore, when the supply of the gas from the inflater is stopped, the lip portion of the seal member is moved away from the inlet opening in the tongue-side duct, so that the gas within the belt is discharged through the gap between the outlet opening and the inlet opening. Thus, the gap provides a vent hole function for discharging the gas.

In addition to the first feature, a large number of small bores for permitting the passage of the gas and inhibiting the passage of foreign matters are defined in the inlet opening in the tongue-side duct. Therefore, when the occupant protecting device is in a non-used state in which the tongue is not coupled to the buckle, it is possible to prevent dust from entering the tongue-side duct through the inlet opening.

To achieve the second object, according to a second aspect and feature of the present invention, there is provided an occupant protecting device comprising a buckle-side duct integral with a buckle supported on a seat, and a tongue-side duct integral with a tongue supported on a belt, an inlet opening in the tongue side duct being connected to an outlet opening in the buckle-side duct, the belt being expanded by supplying a gas generated by an inflater upon collision of a vehicle to the belt through the buckle-side duct and the tongue-side duct, the belt fitted over an outer periphery of the tongue-side duct being tightened and fixed by a band, and a stopper provided at an end of the belt being brought into engagement with an edge of the band, thereby preventing the withdrawal of the belt from the tongue-side duct.

With the above arrangement, even if a load of an occupant moving forward by inertia upon collision of a vehicle is applied in a direction to withdraw the belt from the tongue-side duct, the withdrawal of the belt due to the load can be reliably prevented, because the end of the belt is clamped and fixed to the outer periphery of the tongue-side duct by the band, and the stopper provided at the end of the belt is in engagement with the edge of the band.

In addition to the second feature, the belt is in a double structure comprising an inner bag and an outer cover, and the stopper is a sewing portion for integrally sewing the bag and the cover to each other. Therefore, it is unnecessary to provide a special stopper, leading to reduce costs.

The above and other objects, features and advantages of the invention will become apparent from the following description of the preferred embodiment taken in conjunction with the accompanying drawings.

BRIEF DESCRIPTION OF THE DRAWINGS

FIGS. 1 to 13 show an embodiment of the present invention, wherein:

DETAILED DESCRIPTION OF THE PREFERRED EMBODIMENT

The present invention will now be described by way of a preferred embodiment with reference to the accompanying drawings.

Figure 1:
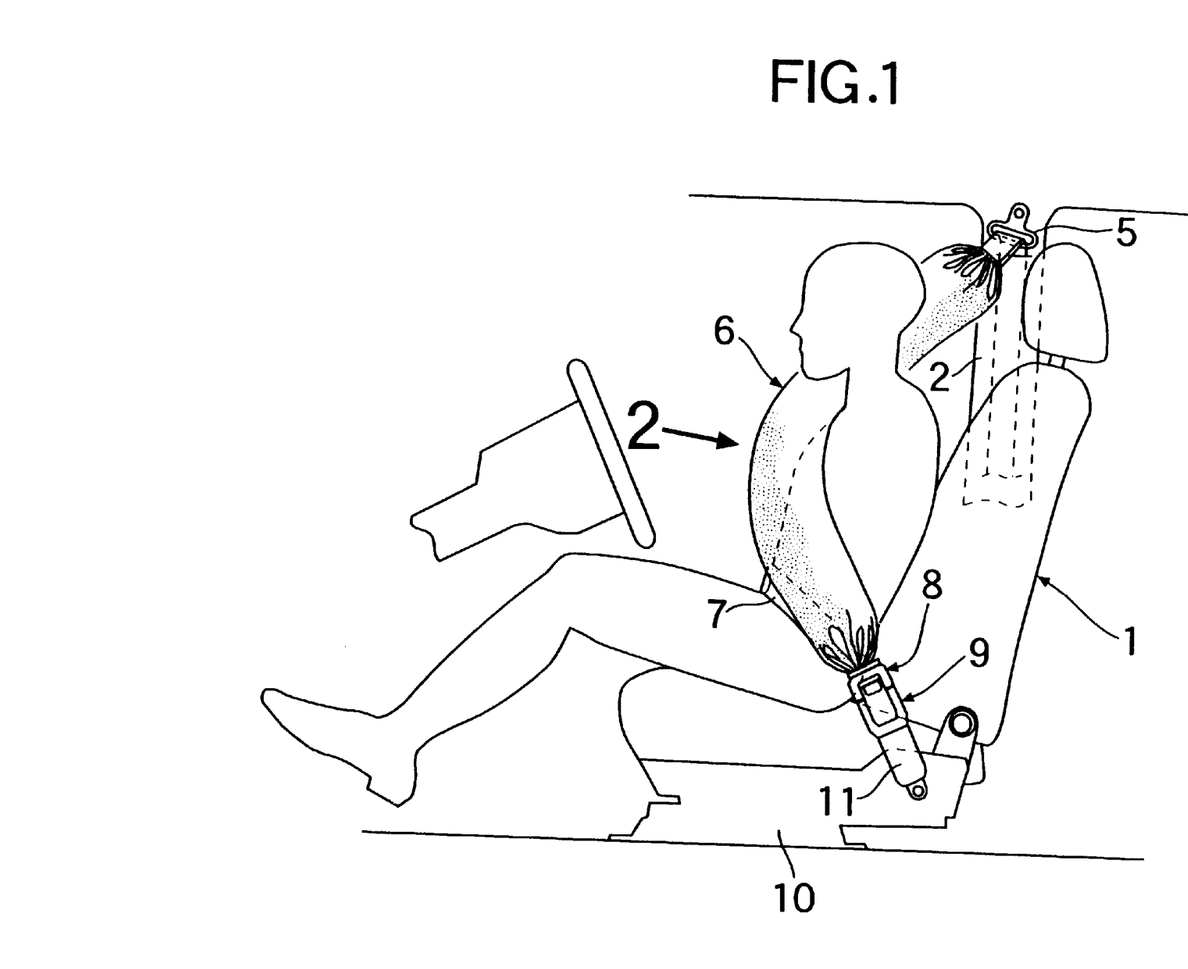
FIG. 1 is a side view of a front seat in a vehicle.
Figure 2:
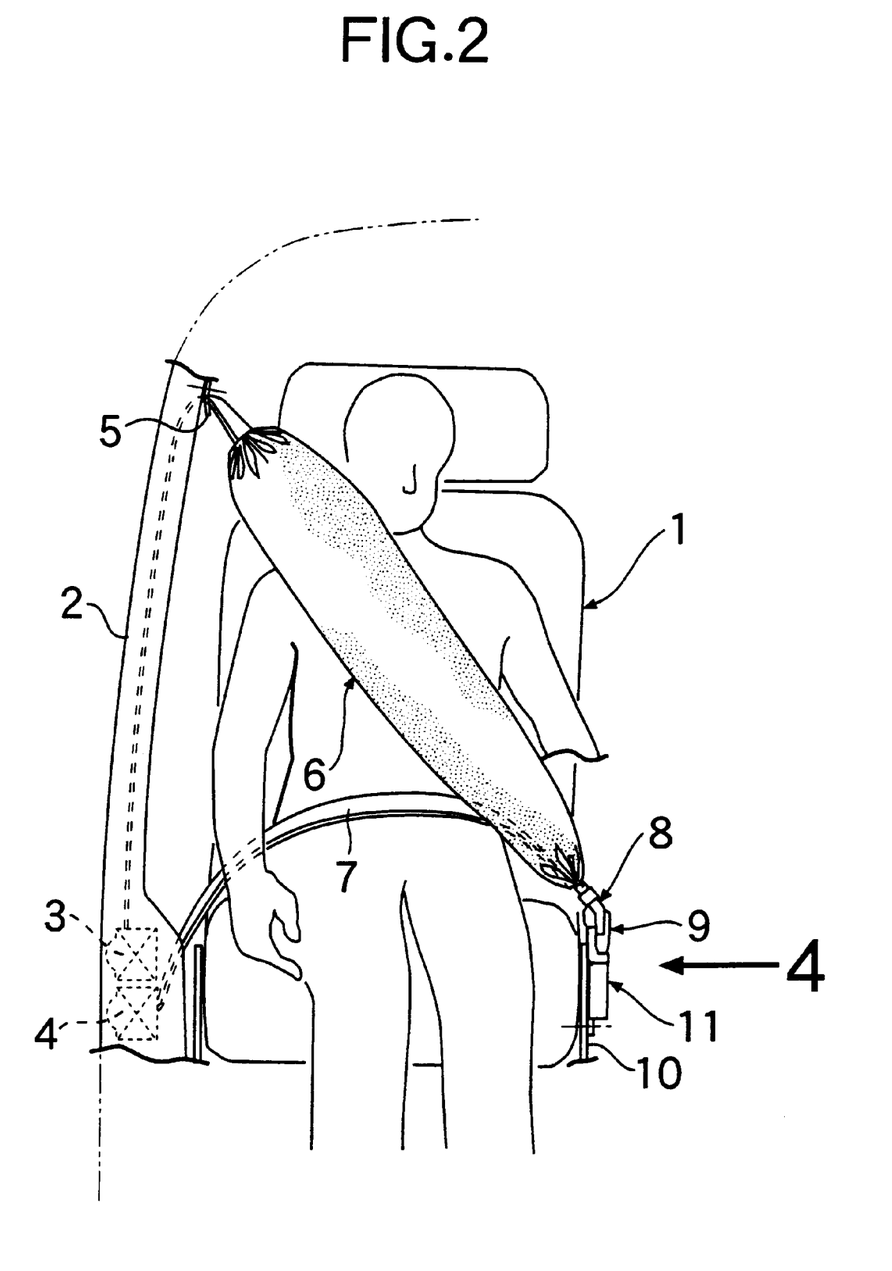
FIG. 2 is a view taken in a direction of an arrow 2 in FIG. 1.
Figure 3:
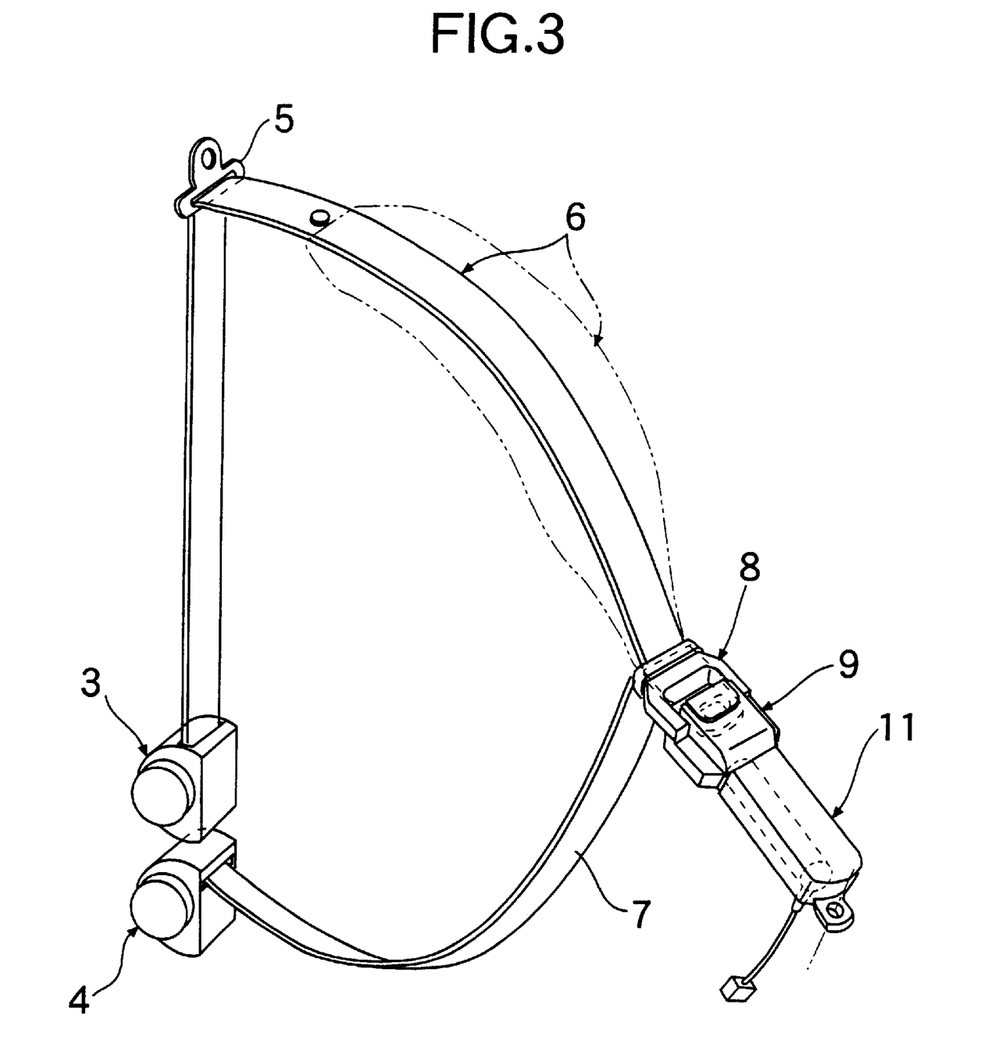
FIG. 3 is a perspective view of an occupant protecting device.

As shown in FIGS. 1 to 3, an occupant protecting device for holding back an occupant (a driver in the embodiment) onto a front right seat 1 includes a shoulder belt retractor 3 mounted at a lower portion of a center pillar 2, a lap belt retractor 4 mounted below the shoulder belt retractor 3, a shoulder belt 6 drawn from the shoulder belt retractor 3 and extending around a slip guide 5 mounted at an upper portion of the center pillar 2, a lap belt 7 drawn from the lap belt retractor 4, a tongue device 8 fixed to ends of the shoulder belt 6 and the lap belt 7, a buckle device 9 to which the tongue device 8 is coupled, and an inflater 11 integral with the buckle device 9 and fixed to a base 10 on the left under the seat 1.

The known shoulder belt retractor 3 and lap belt retractor 4 are adapted to drawably take up the shoulder belt 6 and the lap belt 7, respectively, so that in a normal state when an acceleration sensor (not shown) does not detect an acceleration equal to or larger than a predetermined value, the belts 6 and 7 can be drawn out of the shoulder belt retractor 3 and the lap belt retractor 4 to permit the movement of an occupant's body. When the acceleration sensor has detected an acceleration equal to or larger than the predetermined value upon collision of a vehicle, the belts 6 and 7 are locked not to be drawn out of the shoulder belt retractor 3 and the lap belt retractor 4, thereby holding back an occupant. The inflater 11 is ignited to generate a highpressure gas by burning a propellant when the acceleration sensor has detected an acceleration equal to or larger than the predetermined value.

Figure 6:
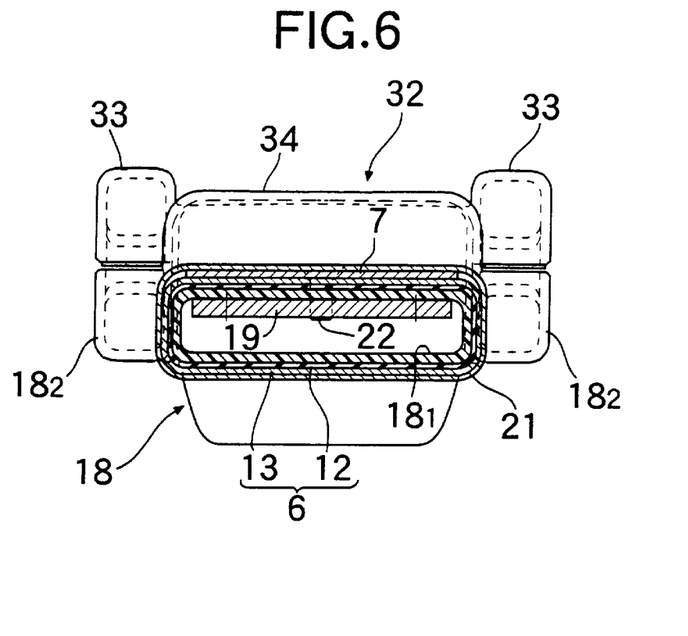
FIG. 6 is a sectional view taken along a line 6—6 in FIG. 4.

The lap belt 7 comprises a plain fabric belt made of a typical synthetic fiber. On the other hand, a portion of the shoulder belt 6, which contacts the chest of the occupant, is comprised of a rubber bag 12 formed into a tubular shape, and a cover 13 which covers the outside of the bag 12 (see FIGS. 6 and 7). The cover 13, formed from a circular knit, can easily expand and shrink radially, but is difficult to expand and shrink longitudinally. The bag 12 and the cover 13 are normally in flat band-like states, but when the high-pressure gas is supplied to the bag 12 from the inlater 11, the bag 12 and the cover 13 are expanded into states shown in FIGS. 1 and 2 to hold back the occupant softly.

Figures 4A, 4B:
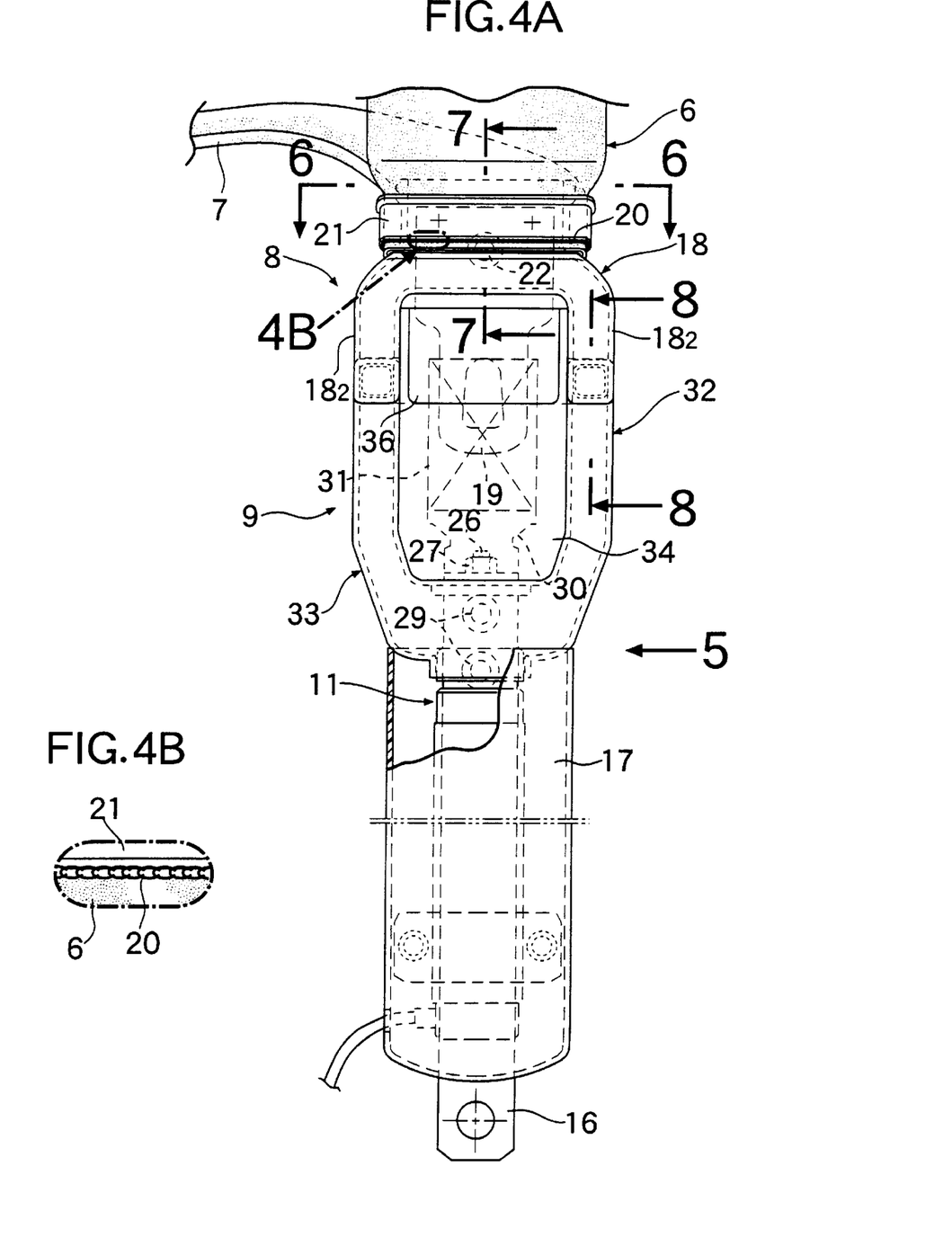
FIG. 4A is an enlarged view taken in a direction of an arrow 4 in FIG. 2.
FIG. 4B is an enlarged view of a portion of FIG. 4A.
Figure 5:
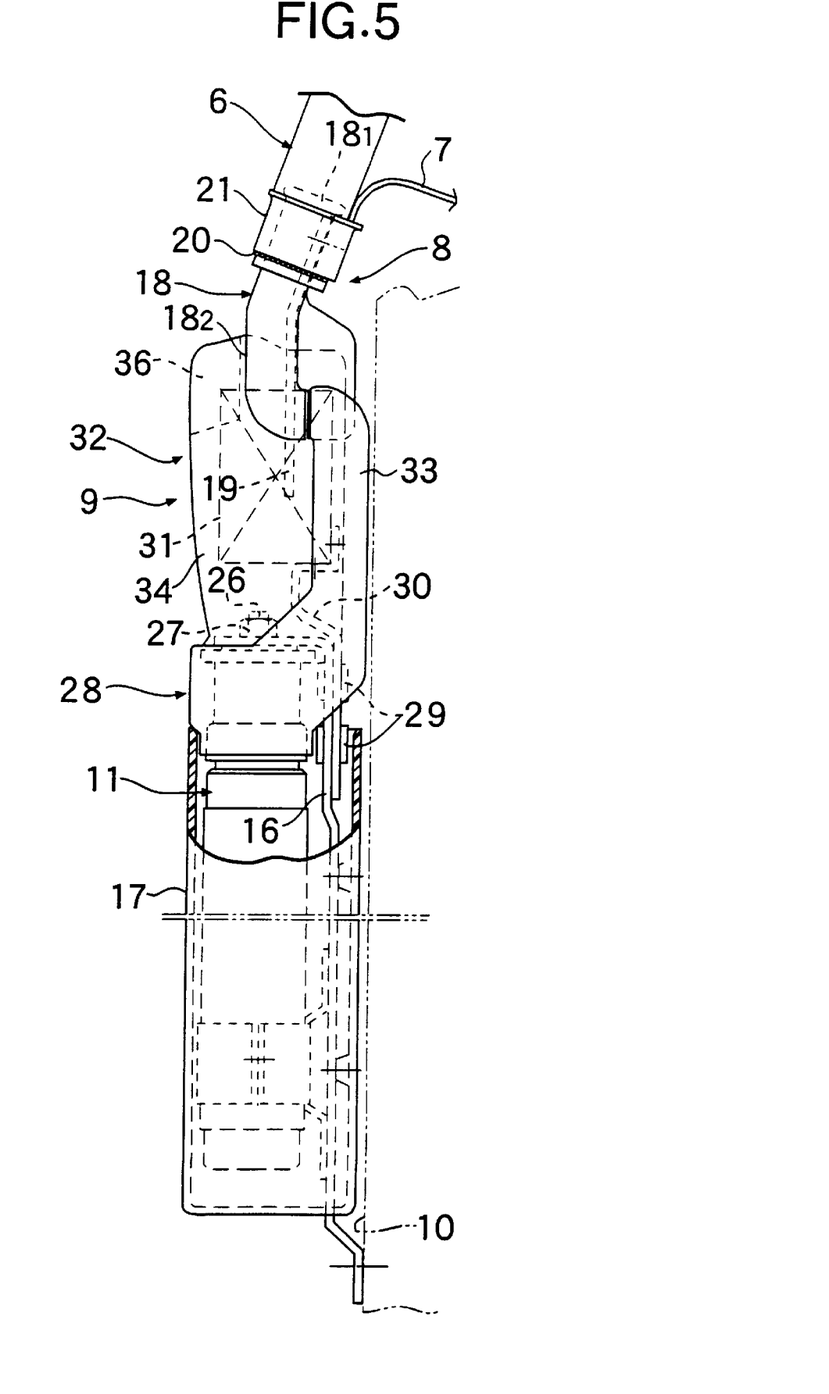
FIG. 5 is a view taken in a direction of an arrow 5 in FIG. 4.

As seen from FIGS. 4A and 5, the substantially cylindrical inflater 11 is supported with its axis aligned vertically along a bracket 16 fixed to the base 10 on the left under the seat 1. The outer periphery of the inflater 11 is covered with an inflater cover 17 made of a synthetic resin.

The structure of the tongue device 8 will be described below with reference to FIGS. 4A to 12.

The tongue device 8 includes a tongue-side bifurcated duct 18 made of a synthetic resin. A tongue 19 made of a metal plate has a base end embedded in a belt coupling portion $18_1$, of the tongue-side duct 18 and extends between a pair of duct portions $18_2$, $18_2$ of the tongue-side duct 18 bifurcated at its tip end. Inlet openings $18_3$, $18_3$ opened toward the base 10 of the seat 1 are defined in tip ends of the pair of duct portions $18_2$, $18_2$ of the tongue-side duct 18. As seen from FIGS. 8 and 10, nine small bores $18_4$ are defined within each of the inlet openings $18_3$, $18_3$ in the tongue-side duct 18, so that the entry of dust can be prevented by the small bores $18_4$, while permitting the supply of the gas into the tongue-side duct 18 (see FIGS. 8 and 10).

Figure 7:
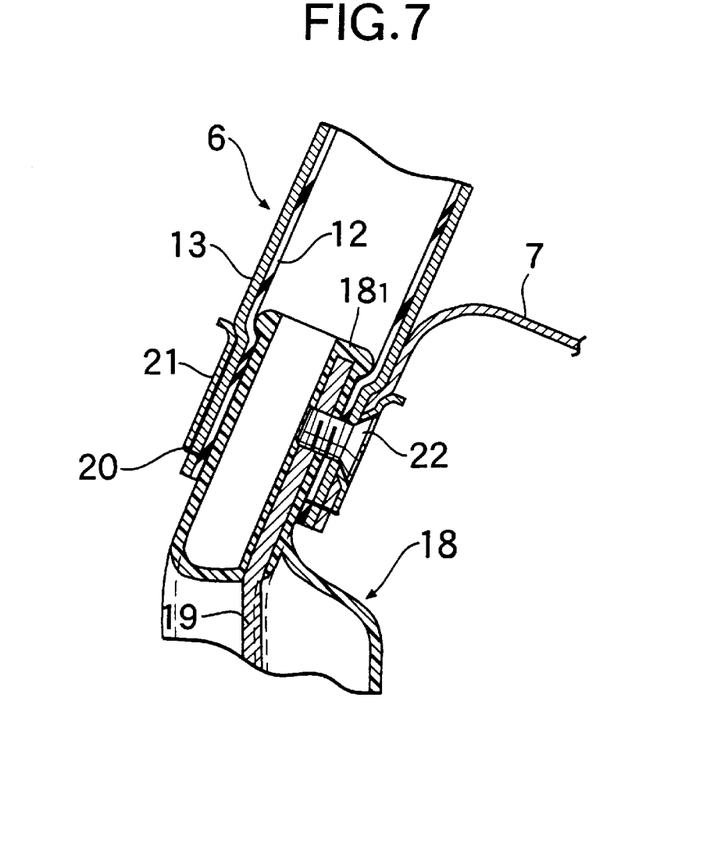
FIG. 7 is a sectional view taken along a line 7—7 in FIG. 4.

As best shown in FIGS. 4A and 7, the internal and external double superposed ends of the bag 12 and the cover 13 of the shoulder belt 6 are integrally sewn together at a sewing portion 20 formed of chain stitches in a state of the end of the lap belt 7 having been further superposed onto the outsides of such ends. In a state in which the end of the shoulder belt 6 has been fitted over the outer periphery of the belt-coupling portion $18_1$, of the tongue-side duct 18, the fixing band 21 is fitted over the outside of the end of the shoulder belt 6, and is caulked inwards and a bolt 22 passed through the fixing band 21, the lap belt 7, the cover 13 and the bag 12 is threadedly inserted into the base end of the tongue 19 embedded in the belt coupling portion $18_1$, of the tongue-side duct 18. Thus, the tongue 19, the tongue-side duct 18, the shoulder belt 6 and the lap belt 7 are integrally coupled together, so that they cannot be separated from one another.

A tensile load applied to the shoulder belt 6 and the lap belt 7 for supporting the chest of the occupant who moves forward by inertia upon collision of the vehicle, acts so as to withdraw the shoulder belt 6 and the lap belt 7 from the belt coupling portion $18_1$, of the tongue-side duct 18. However, the withdrawal of the shoulder belt 6 and the lap belt 7 is prevented by a stopper function of the sewing portion 20 in addition to a compressing force provided by the caulking of the fixing band 21 and a fastening force of the bolt 22. More specifically, the thread of the sewing portion 20 formed of the chain stitches protrudes from surfaces of the shoulder belt 6 and the lap belt 7 and hence, the withdrawal of the shoulder belt 6 and the lap belt 7 can be reliably prevented by bringing the sewing portion 20 into contact with an end edge of the fixing band 21 to allow the sewing portion 20 to function as a stopper (see FIG. 4B). The bolt 22 also has a function to firmly couple the tongue 19 with the tongue-side duct 18 to each other.

Figure 13:
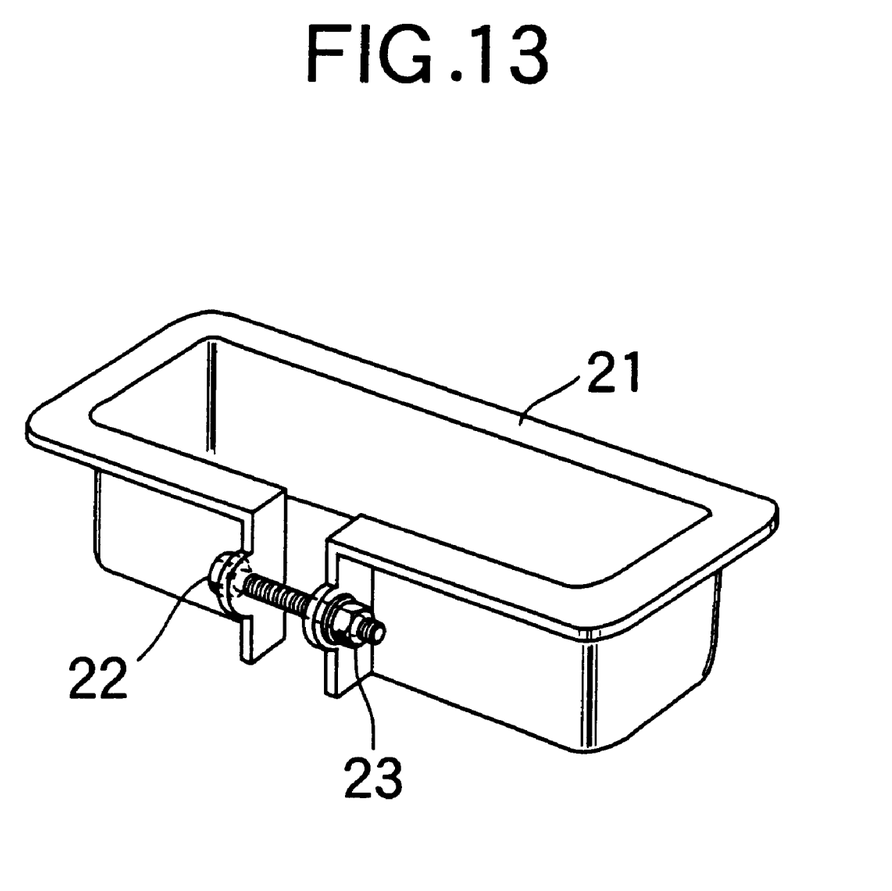
FIG. 13 is a view showing a variation of a fixing band.

As shown in FIG. 13, if the fixing band 21 is tightened by the bolt 22 and a nut 23, the withdrawal of the shoulder belt 6 and the lap belt 7 can be further reliably prevented.

The structure of the buckle device 9 will be described below with reference to FIGS. 4A to 12.

Figure 12:
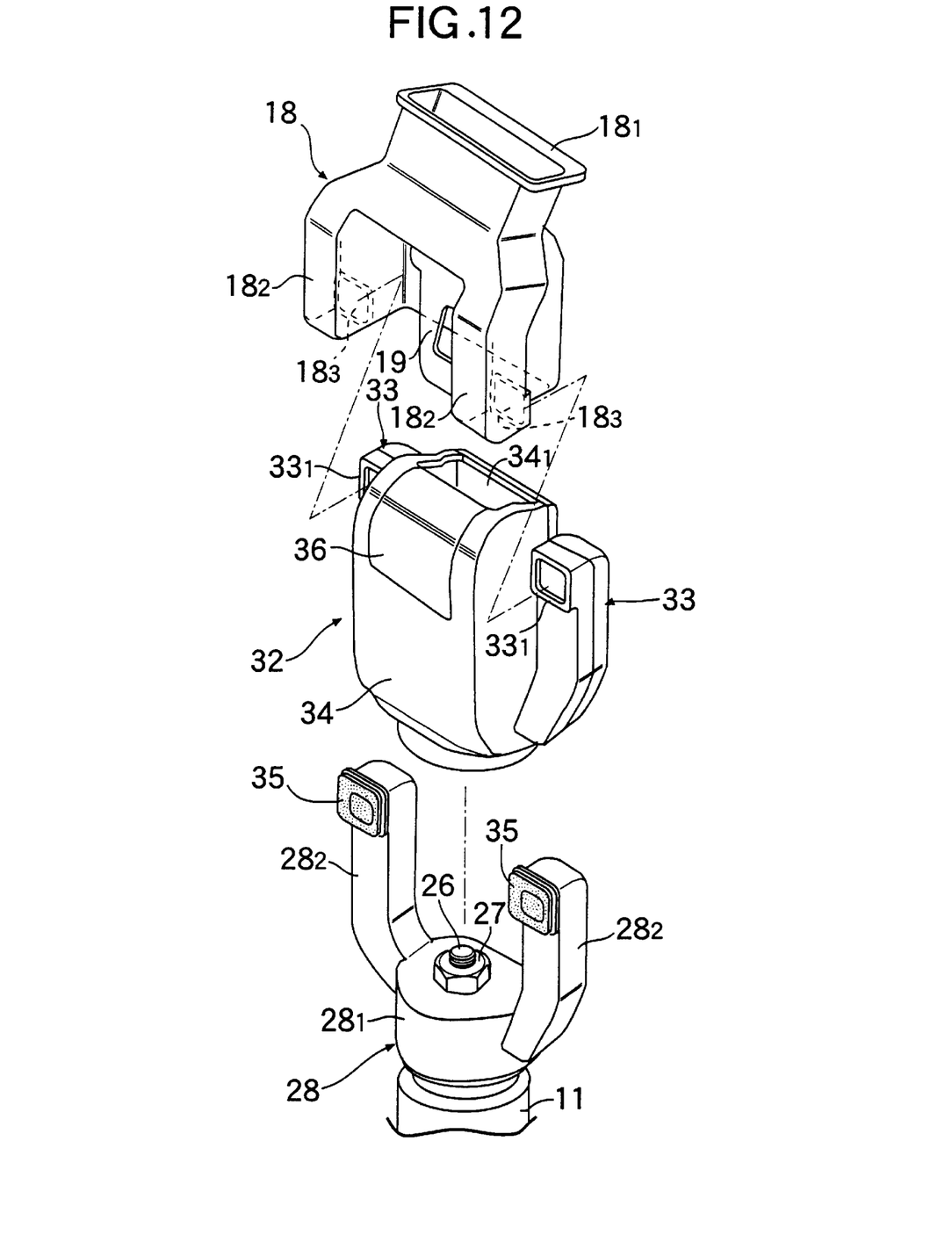
FIG. 12 is an exploded perspective view of the buckle and the tongue.

As seen from FIGS. 5 and 12, the buckle device 9 includes a buckle-side duct 28 fixed to a top of the bracket 16 for supporting the inflater 11 by a bolt 26 and a nut 27, and a buckle 31 fixed to a bracket 30 which is coupled to the bracket 16 by rivets 29, 29. The buckle-side duct 28 includes a gas receiving portion $28_1$, connected to surround a gas ejecting portion at an upper end of the inflater 12, and a pair of duct portions $28_2$, $28_2$ bifurcated from the gas receiving portion $28_1$. The buckle-side duct 28 and the buckle 31 are covered with a duct cover 33 and a body cover 34 of a buckle housing 32 made of a synthetic resin, respectively.

Figure 8:
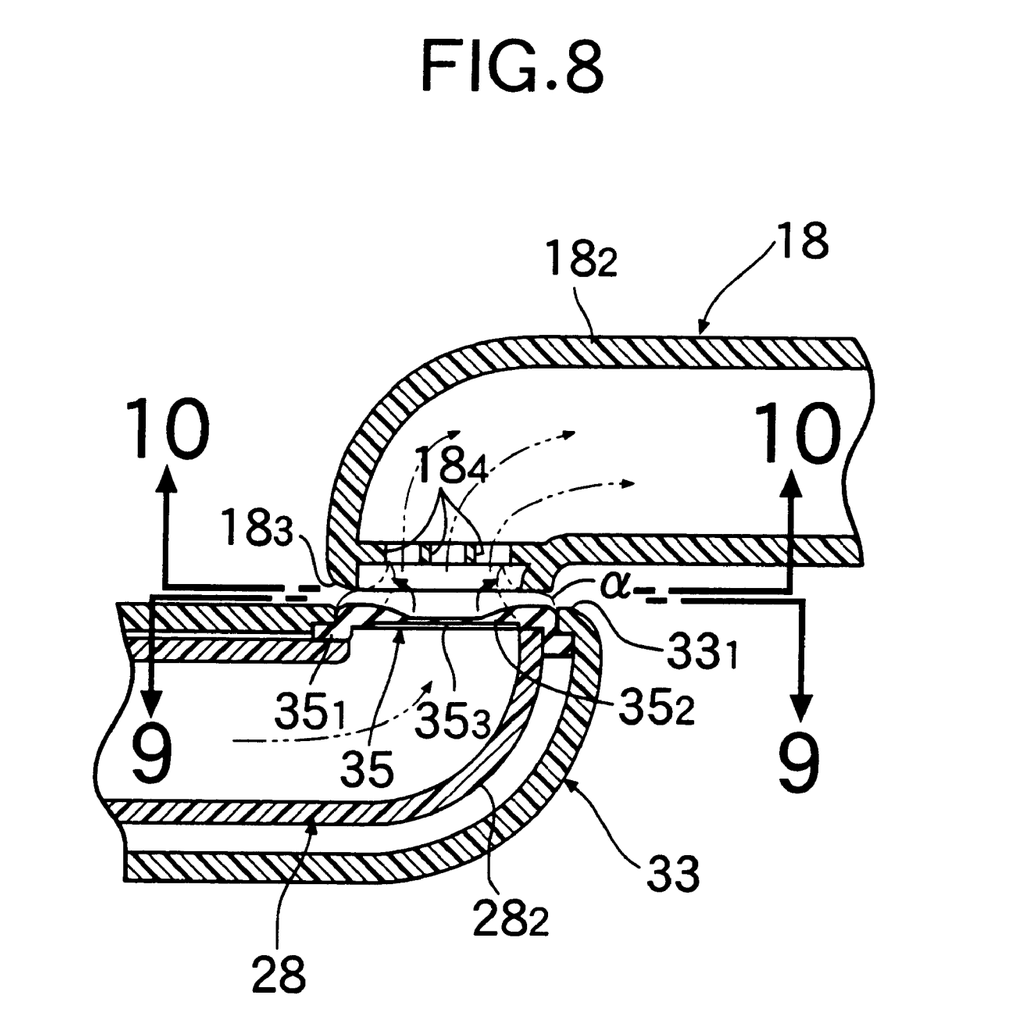
FIG. 8 is a sectional view taken along a line 8—8 in FIG. 4.
Figure 9:
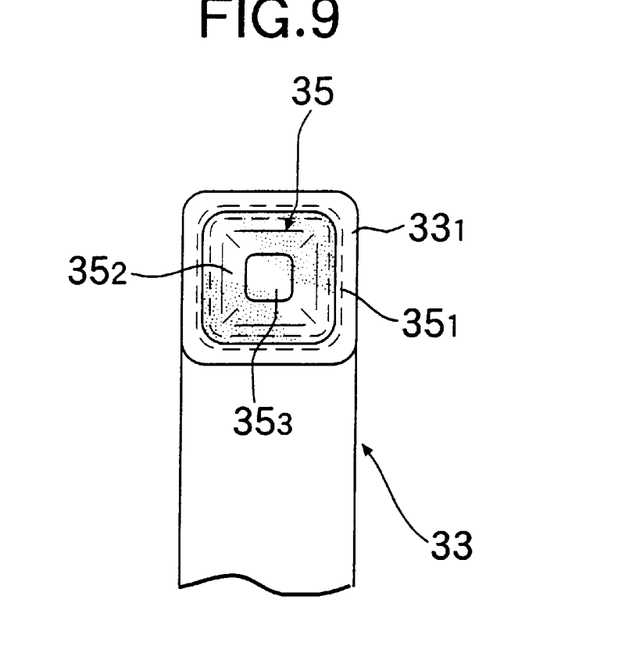
FIG. 9 is a view taken along a line 9—9 in FIG. 8.
Figure 10:
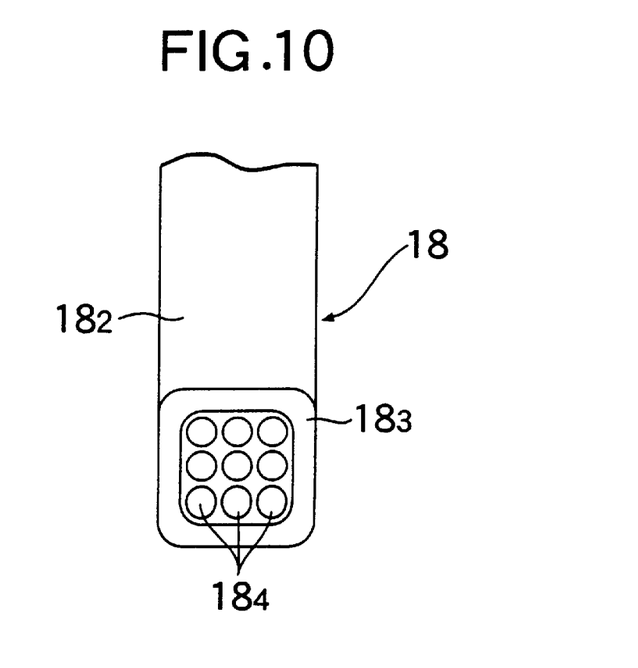
FIG. 10 is a view taken along a line 10—10 in FIG. 8.
Figure 11:
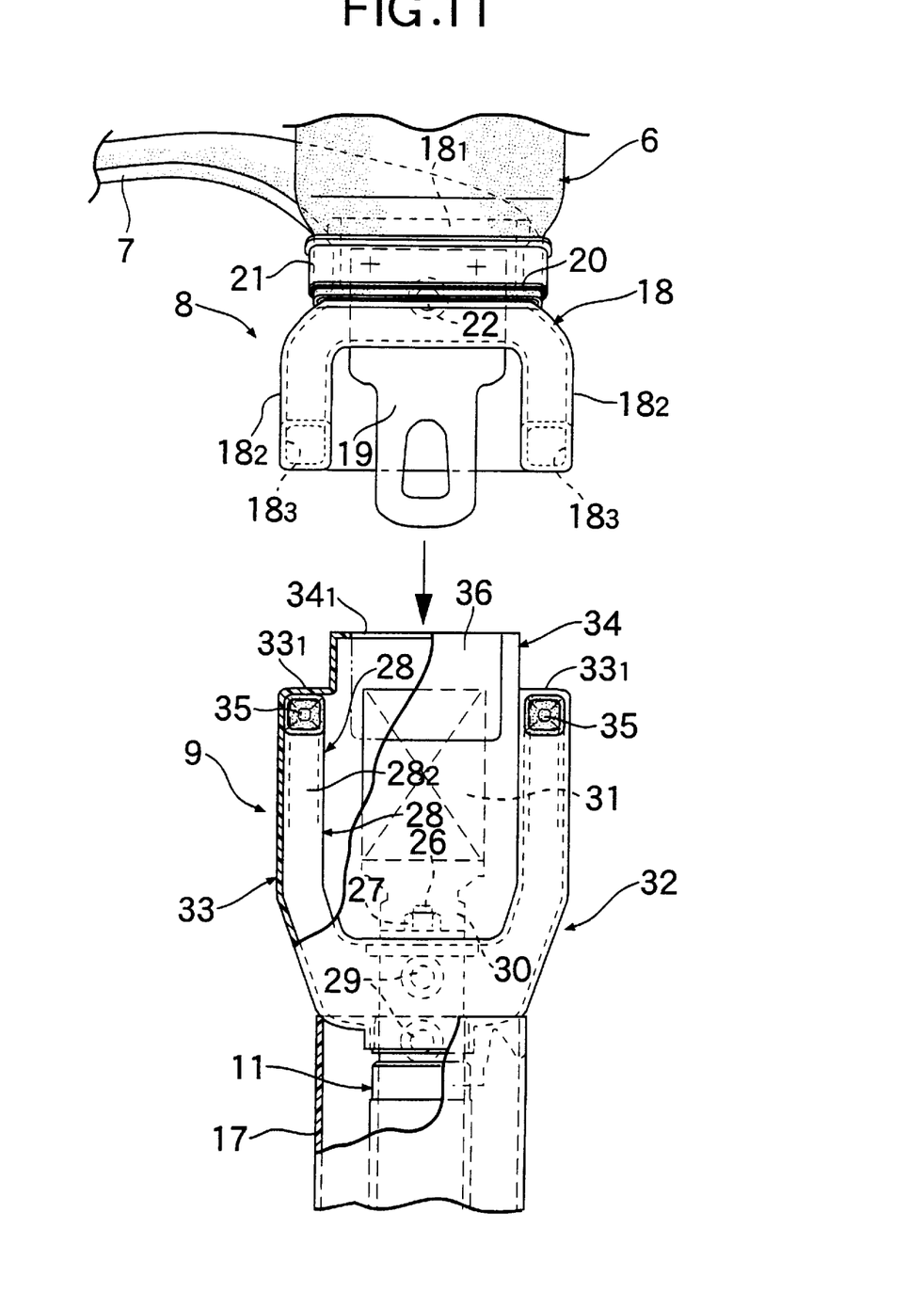
FIG. 11 is a view showing a buckle and a tongue in their separated states.

As can be seen from FIGS. 8 and 9, fixing portions $35_1$, $35_1$, around outer peripheries of seal members 35, 35 made of rubber are clamped and fixed between outlet openings $33_1$, $33_1$, at a tip end of the buckle-side duct 28 and at a tip end of the duct cover 33 of the buckle housing 32. The outlet openings $33_1$, $33_1$, are outlet openings for the gas substantially flowing through the buckle-side duct 28. Lip portions $35_2$, $35_2$ with their thickness gradually decreased toward their inner points are formed on peripheral edges of the seal members 35, 35 exposed to the outlet openings $33_1$, $33_1$, and breakable portions $35_3$, $35_3$ each having extremely small thickness are formed inside the lip portions $35_2$, $35_2$. In a state in which the tongue 19 has been coupled to the buckle 31, the pair of outlet openings $33_1$, $33_1$, in the duct cover 33 faced by the seal members 35, 35 are opposed to the pair of inlet openings $18_3$, $18_3$ in the tongue-side duct 18 at a small gap α (see FIG. 8). Even in a state in which the tongue-side duct 18 is not coupled to the buckle-side duct 28, the seal members 35, 35 cover the outlet openings $33_1$, $33_1$, in the buckle-side duct 28 and hence, dust or the like cannot enter the buckle-side duct 28 through the outlet openings $33_1$, $33_1$.

As can be seen from FIG. 12, the body cover 34 of the buckle housing 32 has a tongue inserting opening $34_1$, through which the tongue 19 is inserted into the buckle 31. A release button 36 for releasing the tongue 19 coupled to the buckle 31 is mounted on the body cover 34 in the vicinity of the tongue inserting opening $34_1$.

The operation of the preferred embodiment of the present invention having the above-described arrangement will be described below.

When the occupant sits on the seat 1 and couples the tongue 19 of the tongue device 8 to the buckle 31 of the buckle device 9, the outlet openings $33_1$, $33_1$, in the buckle-side duct 28 are opposed to the inlet openings $18_3$, $18_3$ in the tongue-side duct 18 at the small gap α. When the gas generated by the inflater 11 upon collision of the vehicle is supplied to the buckle-side duct 28, the breakable portions $35_3$, $35_3$ of the seal members 35, 35 closing the outlet openings $33_1$, $33_1$, in the buckle-side duct 28 are broken by the pressure of the gas, and the lip portions $35_2$, $35_2$ are flexed toward the tongue-side duct 18 into close contact with the inlet openings $18_3$, $18_3$ (see dashed lines in FIG. 8). This causes the outlet openings $33_1$, $33_1$, in the buckle-side duct 28 and the inlet openings $18_3$, $18_3$ in the tongue-side duct 18 to be connected gas-tightly, so that the gas generated by the inflater 11 is supplied through the buckle-side duct 28 and the tongue-side duct 18 into the bag 12 of the shoulder belt 6. As a result, the shoulder belt 6 is expanded to softly hold back the occupant's chest.

When the inflater 11 has stopped the generation of the gas, the lip portions $35_2$, $35_2$ of the seal members 35, 35 are moved away from the inlet openings $18_3$, $18_3$ in the tongue-side duct 18 by their own elasticity and hence, the gap α between the outlet openings $33_1$, $33_1$, and the inlet openings $18_3$, $18_3$ is opened. Usually, a vent hole is defined in the bag 12, and the shock applied to the occupant is weakened by the gas escaping through the vent hole after completion of the expansion of the bag. However, if the gas is allowed to escape through the gap α, the vent hole can be omitted to reduce costs. As described above, when the tongue 19 is coupled to the buckle 31 to connect the tongue-side duct 18 to the buckle-side duct 28, it is unnecessary to bring the inlet openings $18_3$, $18_3$ in the tongue-side duct 18 and the outlet openings $33_1$, $33_1$, in the buckle-side duct 28 into gas-tight contact with each other through the seal members 35, 35. Therefore, it is possible not only to smoothly perform the attachment and detachment of the tongue 19 and the buckle 31 without being obstructed by the seal members 35, 35, but also, it is possible to prevent damage to the seal members 35, 35.

Although the preferred embodiment of the present invention has been described in detail, it will be understood that the present invention is not limited to the above-described embodiment, and various modifications in design may be made without departing from the spirit and scope of the invention defined in claims.

For example, the inflater 11 is mounted integrally with the buckle 31 in the embodiment, but the inflater 11 and the buckle may be separately mounted. The stopper is constituted by the sewing portion 20 which integrally sews the bag 12 and the cover 13 together in the embodiment, but a separate stopper may be sewn the belt 6, or a stopper may be integrally formed on the belt 6 allowing the surface of the belt 6 to protrude.

What is claimed is:

1. An occupant protecting device comprising:

a buckle-side duct integral with a buckle supported on a seat; and a tongue-side duct integral with a tongue supported on a belt, said buckle and said tongue being coupled to each other to place an outlet opening in said buckle-side duct in a state opposed to an inlet opening in said tongue-side duct, said belt being expanded by a gas, generated by an inflater upon collision of a vehicle, supplied to said belt through said buckle-side duct and said tongue-side duct, said outlet opening in said buckle-side duct being closed by a membrane-shaped seal member which is integrally provided with a lip portion at a peripheral edge thereof and a central breakable portion, and a connection between said outlet and inlet openings being created upon breaking of said breakable portion of said seal member by the pressure of the gas generated by said inflater upon collision of the vehicle, bringing said lip portion into contact with said inlet opening in said tongue-side duct and sealing said connection between said outlet and inlet openings against an outside of said ducts.

2. An occupant protecting device according to claim 1, wherein said buckle and said tongue are coupled to each other, a gap for venting the gas to said outside of the ducts is defined between said outlet opening in said buckle-side duct and said inlet opening in said tongue-side duct.

3. An occupant protecting device according to claim 1, further comprising small bores defined in the inlet opening in the tongue-side duct permitting passage of the gas and inhibiting passage of foreign matters.

4. An occupant protecting device comprising:

a buckle-side duct integral with a buckle supported on a seat; and a tongue-side duct integral with a tongue supported on a belt, an inlet opening in said tongue-side duct being opposed to an outlet opening in said buckle-side duct upon coupling of said ducts, said belt being expanded by a gas, generated by an inflater upon collision of a vehicle, supplied to said belt through said buckle-side duct and said tongue-side duct, said belt, fitted over an outer periphery of said tongue-side duct, being tightened and fixed by a band, and a stopper provided on an end of said belt being brought into engagement with an edge of said band, said stopper preventing withdrawal of said belt from said tongue-side duct.

5. An occupant protecting device according to claim 4, wherein said belt is in a double structure comprising an inner bag and an outer cover, and said stopper is a sewing portion for integrally sewing said bag and said cover to each other.

6. An occupant protecting device for a seat comprising:

a buckle supported on the seat and having a buckle-side duct with an outlet opening, said outlet opening being closed by a seal member having a lip portion at a peripheral edge thereof and a central breakable portion;

an expandable belt having a tongue, connectable to said buckle, and a tongue-side duct with an inlet opening, said inlet opening opposing said outlet opening when said tongue is coupled to said buckle; and an inflater holding a pressurized gas to be supplied to said expandable belt through said buckle-side duct and said tongue-side duct, wherein a connection is created between said outlet and inlet openings only when said central breakable portion of said seal member is broken and said lip portion of said seal member is moved towards said inlet opening by pressure from said gas when said gas is supplied from said inflater to said expandable belt, and said lip portion of the seal member provides a seal of said connection between said outlet and inlet openings against an outside of said ducts.

7. An occupant protecting device according to claim 6, further comprising a gap, defined between said outlet opening and said inlet opening opposed each other when said tongue is coupled to said buckle, through which said gas is vented from said belt to said outside of the ducts after said inflater supplied said gas to said belt.

8. An occupant protecting device according to claim 6, wherein said inlet opening in said tongue-side duct includes bores permitting passage of said gas and inhibiting passage of foreign matters.

9. An occupant protecting device according to claim 6, wherein said belt is fitted over an outer periphery of said tongue-side duct and is fixed by a band, said belt further comprising a stopper abutting an edge of said band to prevent withdrawal of said belt from said tongue-side duct.

10. An occupant protecting device according to claim 6, wherein said belt is fitted over an outer periphery of said tongue-side duct and is fixed by a band, said belt further comprising an inner expandable bag, an outer cover, and a sewing portion sewing said bag to said cover, said sewing portion abutting an edge of said band to prevent withdrawal of said belt from said tongue-side duct.

11. An occupant protecting device according to claim 1, wherein said outlet opening is perpendicular to a length of said buckle-side duct, and said inlet opening is perpendicular to a length of said tongue-side duct.

12. An occupant protecting device according to claim 6, wherein said outlet opening is perpendicular to a length of said buckle-side duct, and said inlet opening is perpendicular to a length of said tongue-side duct.

* * * * *